Feb. 26, 1952          M. RETTINGER          2,587,219
PUSH-PULL SIGNALING SYSTEM
Original Filed May 31, 1946
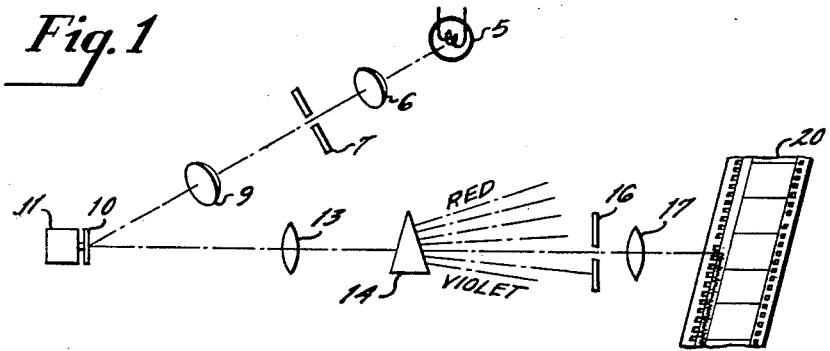
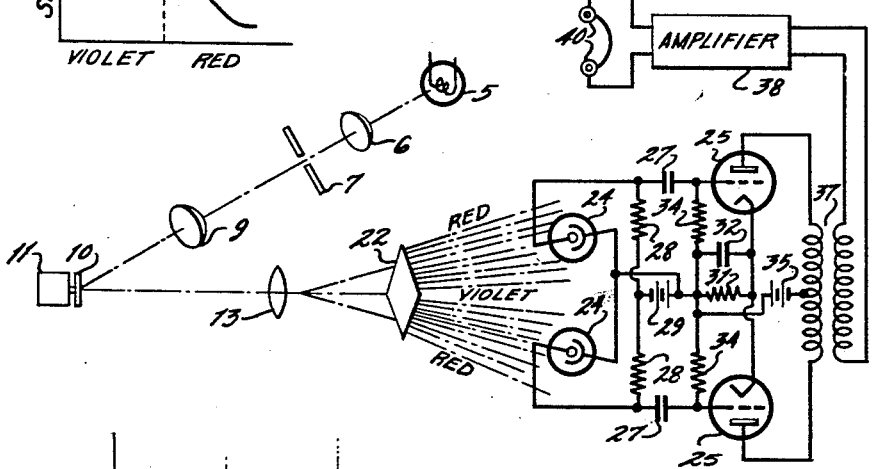
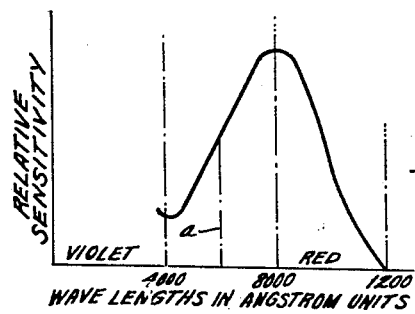
Inventor
Michael Rettinger
By
Attorney Patented Feb. 26, 1952

2,587,219

UNITED STATES PATENT OFFICE 2,587,219

PUSH-PULL SIGNALING SYSTEM

Michael Rettinger, Encino, Calif., assignor to Radio Corporation of America, a corporation of Delaware Original application May 31, 1946, Serial No. 673,389. Divided and this application January 28, 1950, Serial No. 140,979

6 Claims. (Cl. 179—100.3)

This invention relates to sound recording and signal transmission systems, and particularly to such systems in which the light spectrum is utilized in the recording, modulation, and detection of a signal. This application is a division of my copending application, Ser. No. 673,389, filed May 31, 1946, now abandoned.

In my U. S. Patent No. 2,423,254 of July 1, 1947, I disclose and claim a communication system utilizing light waves as the transmission medium, the light waves being divided into a spectrum which is vibrated in accordance with the amplitude and frequency of the signal being transmitted. I also disclose a transmission receiving element, such as a photoelectric cell, in which the output varies with the portion of the spectrum being impressed thereon at any particular instant.

The present invention utilizes the same basic principal, but applies it to the production of a sound on film record and to push-pull detection. It is well-known that the sensitivity of film emulsions varies with the wave length of light. That is, with certain types of emulsions, light waves at the violet end of the spectrum produce a greater reaction in the light sensitive emulsion than light waves at the red end of the spectrum, while others are more sensitive to infrared light waves. Also, as pointed out in my above-mentioned patent, photoelectric cells, such as an RCA No. 923, have a characteristic such that the output therefrom is greater when light in the red end of the spectrum is impressed thereon than when light in the violet end of the spectrum is received. These factors are utilized in the present invention to provide a sound recording system and push-pull detection in accordance with the principle disclosed and claimed in my above-identified patent.

The principal object of the invention, therefore, is to facilitate the recording and transmission of a signal.

Another object of the invention is to provide an improved method of and system for transmitting and recording a signal.

A further object of the invention is to provide a light beam communication system utilizing push-pull action.

A still further object of the invention is to provide a sound recording system utilizing the variations in film sensitivity in accordance with the wave length of light.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a diagrammatic view of a sound recording system embodying the invention.

Fig. 2 is a graph showing the variation between sensitivity and wave length of light for a type of emulsion used in the invention.

Fig. 3 is a diagrammatic view of a sound transmission system utilizing a push-pull detector, and Fig. 4 is a graph showing the relationship between the sensitivity of a photoelectric cell and the wave length of light.

Referring now to Figs. 1 and 2, a source of white light is shown at 5 with a collective lens 6 and an aperture mask 7. The light passing the aperture in the mask 7 is projected by a lens 9 to a mirror 10 of a galvanometer 11. Reflected light from the mirror 10 is projected by a lens 13 to a prism 14 which divides the light into the spectrum from red to violet, as illustrated. Following the prism 14, is a slit mask 16 and a projection lens 17 for projecting the portion of the spectrum passing the slit in the mask 16 to the sound track area of a film 20.

The film 20 is coated with an emulsion having a characteristic such as shown in Fig. 2; that is, the emulsion will be activated to a greater extent by light toward the violet end of the spectrum than toward the red end when the intensities are equal. Thus, the normal, zero, or rest position of the recording system is set at a point such that that portion of the spectrum will strike the film as indicated by the dotted line in Fig. 2. Now, when the mirror 10 is vibrated by a signal so that the spectrum is shifted downwardly in the drawing, more light toward the red end passes the slit in mask 16, while a shift in the opposite direction will pass light toward the violet end. In this manner, a record is produced on the film 20 after development which will have striations varying in density in accordance with the amplitude and frequency of the vibration of the mirror 10 which corresponds to the amplitude and frequency of the signal current impressed on the galvanometer 11.

Referring now to Figs. 3 and 4, a similar light modulating system is shown at the left-hand portion of Fig. 3, except that in this instance, a double prism 22 is illustrated to provide a double spectrum in which the red light is at the extreme edges and the violet light at the center, as indicated. The receiving portion of the system includes a pair of push-pull photoelectric cells 24 having a characteristic such as shown in Fig. 4, these cells being connected to a pair of push-pull amplifier tubes 25. The interconnecting circuit includes a pair of blocking condensers 27, a pair of polarizing resistors 28 with a polarizing battery 29, a self biasing resistor 31, a by-pass condenser 32, and grid resistors 34. A plate potential supply is shown at 35, and a push-pull output transformer at 37, the secondary of which is connected to a power amplifier 38 which may feed any current to sound transducer, such as a pair of ear phones 40.

Since each photoelectric cell 24 has a characteristic such as shown in Fig. 4, the normal or rest position of the modulating system is such that the portion of the spectrum reaching each cell is as shown by the broken line $a$ in Fig. 4. Thus, as the signal is impressed on galvanometer 11, the spectrum will shift, and, when moved in one direction, light toward the violet end will be impressed on one cell, while simultaneously, light toward the red end will be impressed on the other cell. Therefore, the output of one cell decreases as the output from the other cell increases along the left-hand straight portion of the curve in Fig. 4. Such differentials in output will be amplified in a push-pull manner in tubes 25 and will appear at headphones 40. As in all push-pull transmission systems, a more stable and efficient detecting system is obtained, since even harmonics are balanced out in a push-pull circuit.

If desired, apertured shields may be placed in front of photoelectric cells 24 to exclude extraneous light and provide limited beams to the cathodes of the cells. If such limited beams were impressed along two longitudinal strips of film, such as shown at 20 in Fig. 1, a push-pull sound record would be recorded.

I claim:

1. A signal transmission system comprising a source of white light, means for producing two complete spectrums of said light, means for modulating said spectrums by varying the position thereof in accordance with the amplitude and frequency of a signal to be transmitted, a pair of photoelectric cells positioned to receive waves of the same wave length from each of said spectrums at zero position of said modulating means, one of said cells being positioned to receive one end of one spectrum when the other of said cells receives the other end of said other spectrum, a pair of vacuum tubes, and means for connecting said cells to said vacuum tubes in a push-pull relationship.

2. A signal transmission system comprising a source of white light, means for modulating said light in accordance with the amplitude and frequency of a signal to be transmitted, means for producing two complete spectrums of said white light for transmission, a pair of photoelectric cells positioned to receive the light of said spectrums and having a response varying with the wave length of light impressed thereon, the same wave lengths of said light being impressed on each of said cells during the rest position of said modulating means, variation of said spectrum on said cells being such that as one end of said spectrum is impressed on one cell, the opposite end of said other spectrum is impressed on the other cell, an amplifier, and means for connecting said cells in a push-pull relationship to said amplifier.

3. A light communication system comprising a source of white light, means for dividing said white light into two complete adjacent spectrums, means for simultaneously shifting the positions of said spectrums in accordance with the amplitude and frequency of a signal, a pair of photoelectric cells, and an amplifier, said cells and amplifier being connected in a push-pull relationship, said shifting means impressing one end of one spectrum on one cell and the opposite end of said other spectrum on said other cell at any instant.

4. A light communication system in accordance with claim 3, in which said shifting means includes a vibratable mirror and said dividing means includes a double prism.

5. A signal modulating system comprising a source of white light, means for vibrating said light in accordance with the amplitude and frequency of a signal, means for producing two complete color spectrums of said white light, said spectrums having the same color adjacent one another, light sensitive means positioned to receive said spectrums, and light aperture shields in front of said light sensitive means, vibration of said white light impressing one color end of one of said spectrums and the opposite color end of the other of said spectrums on said light sensitive means.

6. A push-pull signal modulating means comprising a source of white light, means for forming said white light into two complete color spectrums having their same color ends adjacent one another, light sensitive surfaces, each positioned to receive a portion of each of said spectrums in accordance with the spatial positions of said spectrums, and means for vibrating said spectrums in accordance with the frequency and amplitude of a signal, the same color portion of each spectrum being impressed on said surfaces at times of no signal.

MICHAEL RETTINGER.

REFERENCES CITED

The following references are of record in the file of this patent:

UNITED STATES PATENTS

| Number | Name | Date |
| --- | --- | --- |
| 1,993,929 | Hammond | Mar. 12, 1935 |
| 2,102,695 | Geiskieng | Dec. 21, 1937 |
| 2,186,157 | Van Leer | Jan. 9, 1940 |
| 2,292,062 | Dimmick | Aug. 4, 1942 |
| 2,423,254 | Rettinger | July 1, 1947 |